US011339233B2

(12) United States Patent
Shoemaker et al.

(10) Patent No.: US 11,339,233 B2
(45) Date of Patent: May 24, 2022

(54) FLAME RETARDANT POLY(VINYL CHLORIDE) COMPOUNDS

(71) Applicant: GEON Performance Solutions, LLC, Westlake, OH (US)

(72) Inventors: Craig L. Shoemaker, North Ridgeville, OH (US); Amjad Abu-Ali, Avon Lake, OH (US)

(73) Assignee: GEON Performance Solutions, LLC, Westlake, OH (US)

( * ) Notice: Subject to any disclaimer, the term of this patent is extended or adjusted under 35 U.S.C. 154(b) by 0 days.

(21) Appl. No.: 16/647,459

(22) PCT Filed: Sep. 11, 2018

(86) PCT No.: PCT/US2018/050498
§ 371 (c)(1),
(2) Date: Mar. 13, 2020

(87) PCT Pub. No.: WO2019/055426
PCT Pub. Date: Mar. 21, 2019

(65) Prior Publication Data
US 2020/0216586 A1    Jul. 9, 2020

Related U.S. Application Data

(60) Provisional application No. 62/559,252, filed on Sep. 15, 2017.

(51) Int. Cl.
*C08G 63/16* (2006.01)
*C08K 3/013* (2018.01)
(Continued)

(52) U.S. Cl.
CPC ............ *C08F 114/06* (2013.01); *C08K 3/013* (2018.01); *C08K 3/014* (2018.01); *C08K 3/016* (2018.01);
(Continued)

(58) Field of Classification Search
None
See application file for complete search history.

(56) References Cited

U.S. PATENT DOCUMENTS 2,753,595 A    7/1956  Dulmage
2,996,489 A    8/1961  Dannis et al.
(Continued)

FOREIGN PATENT DOCUMENTS

CN    1296514 A    5/2001
CN    101497727 A    8/2009
(Continued)

OTHER PUBLICATIONS

International Search Report and Written Opinion for International Application No. PCT/US2018/050498 dated Feb. 18, 2019.
(Continued)

*Primary Examiner* — Richard A Huhn
(74) *Attorney, Agent, or Firm* — Wolf, Greenfield & Sacks, P.C.

(57) ABSTRACT

Disclosed herein are plasticized poly(vinyl chloride) compounds. One aspect relates to a flame retardant poly(vinyl chloride) compound, comprising a mixture of poly(vinyl chloride); and a plasticizer comprising polymeric plasticizer, and/or alkyl aryl fire retardant plasticizer, wherein the mixture has a Limiting Oxygen Index of greater than 50% according to ASTM D2863; an Elongation at Break of at least 10% according to ASTM D638 (Type IV); and a Modulus of Elasticity of less than about 15,000 psi according to ASTM 638 (Type IV).

28 Claims, 1 Drawing Sheet

(51) Int. Cl.
| | |
|---|---|
| *C08K 3/014* | (2018.01) |
| *C08K 3/016* | (2018.01) |
| *C08K 3/105* | (2018.01) |
| *C08K 3/11* | (2018.01) |
| *C08K 5/523* | (2006.01) |
| *C08L 67/02* | (2006.01) |
| *C08L 27/06* | (2006.01) |
| *C08F 114/06* | (2006.01) |
| *C08K 5/053* | (2006.01) |
| *C08K 5/092* | (2006.01) |
| *C08K 5/12* | (2006.01) |
| *C08K 5/521* | (2006.01) |
| *C08K 3/38* | (2006.01) |

(52) U.S. Cl.
CPC .............. *C08K 3/105* (2018.01); *C08K 3/11* (2018.01); *C08K 5/053* (2013.01); *C08K 5/092* (2013.01); *C08K 5/12* (2013.01); *C08K 5/521* (2013.01); *C08K 5/523* (2013.01); *C08L 27/06* (2013.01); *C08L 67/02* (2013.01); *C08G 63/16* (2013.01); *C08K 2003/387* (2013.01); *C08L 2201/02* (2013.01)

(56) References Cited

U.S. PATENT DOCUMENTS

| | | | | |
|---|---|---|---|---|
| 3,476,627 | A | 11/1969 | Squires | |
| 3,486,193 | A | 12/1969 | Christensen et al. | |
| 3,655,850 | A | 4/1972 | Woodham et al. | |
| 3,670,056 | A | 6/1972 | Heiberger et al. | |
| 3,674,812 | A * | 7/1972 | Gibbons | C08L 67/00 549/558 |
| 3,712,594 | A | 1/1973 | Schippers et al. | |
| 3,712,776 | A | 1/1973 | Woodham et al. | |
| 3,714,315 | A | 1/1973 | Minton et al. | |
| 3,819,577 | A * | 6/1974 | McRowe | C08L 27/06 524/413 |
| 3,868,341 | A * | 2/1975 | Sauer | C08K 5/16 523/434 |
| 3,880,802 | A * | 4/1975 | Dickens, Jr. | C08K 3/24 524/413 |
| 3,901,850 | A * | 8/1975 | Kurtz | C08K 3/24 524/406 |
| 3,926,881 | A * | 12/1975 | Kracklauer | C08K 57/00 524/176 |
| 3,926,883 | A * | 12/1975 | Touval | C08K 3/20 524/405 |
| 3,929,933 | A * | 12/1975 | Gallagher | C08L 25/02 525/223 |
| 3,941,908 | A * | 3/1976 | Valia | C08K 13/02 428/379 |
| 3,953,650 | A * | 4/1976 | Sauer | C08K 5/00 428/389 |
| 3,957,723 | A * | 5/1976 | Lawson | C08K 3/22 524/432 |
| 3,985,706 | A * | 10/1976 | Kay | C08K 3/22 524/405 |
| 3,988,393 | A * | 10/1976 | Gallagher | C08F 265/04 525/226 |
| 3,992,500 | A | 11/1976 | Kruder et al. | |
| 3,993,607 | A | 11/1976 | Florence | |
| 4,001,172 | A | 1/1977 | Steinkamp et al. | |
| 4,003,874 | A | 1/1977 | Ide et al. | |
| 4,004,405 | A * | 1/1977 | Darchuk | C08L 27/06 57/255 |
| 4,015,832 | A | 4/1977 | Kruder | |
| 4,035,324 | A * | 7/1977 | Lawson | C08K 3/38 524/180 |
| 4,046,719 | A * | 9/1977 | Stanaback | C07F 9/091 521/155 |
| 4,049,747 | A * | 9/1977 | Jin | C08L 23/02 524/533 |
| 4,079,036 | A * | 3/1978 | Ohmori | D01F 6/48 523/206 |
| 4,100,325 | A | 7/1978 | Summers et al. | |
| 4,102,106 | A | 7/1978 | Golder et al. | |
| 4,111,882 | A * | 9/1978 | Deatcher | C08K 5/5333 524/130 |
| 4,111,885 | A * | 9/1978 | Abu-Isa | C08K 13/02 524/314 |
| 4,123,585 | A * | 10/1978 | Sparzak | H01B 3/443 428/379 |
| 4,147,636 | A * | 4/1979 | Drake | C08K 5/0066 252/609 |
| 4,154,922 | A * | 5/1979 | Donohue | C08L 27/06 528/183 |
| 4,207,224 | A * | 6/1980 | Randell | C08L 101/04 524/123 |
| 4,213,487 | A | 7/1980 | Funk et al. | |
| 4,272,427 | A * | 6/1981 | Davis | C08K 3/26 524/141 |
| 4,288,588 | A * | 9/1981 | Donohue | C08G 63/185 528/337 |
| 4,308,198 | A * | 12/1981 | Vroomans | C08K 3/24 524/413 |
| 4,341,881 | A * | 7/1982 | Kracklauer | C08K 3/2279 252/609 |
| 4,403,056 | A * | 9/1983 | Giolito | C08K 5/109 524/280 |
| 4,423,960 | A | 1/1984 | Anders | |
| 4,459,387 | A | 7/1984 | Parker | |
| 4,491,553 | A | 1/1985 | Yamada et al. | |
| 4,496,692 | A | 1/1985 | Riew et al. | |
| 4,514,449 | A | 4/1985 | Budich et al. | |
| 4,536,360 | A | 8/1985 | Rahrig | |
| 4,560,618 | A * | 12/1985 | Goswami | C08L 27/06 428/500 |
| 4,573,799 | A | 3/1986 | Anders | |
| 4,593,060 | A * | 6/1986 | Gupta | C08K 5/098 524/397 |
| 4,616,989 | A | 10/1986 | Mewes et al. | |
| 4,680,334 | A * | 7/1987 | Wallace | C08L 27/06 524/406 |
| 4,702,961 | A * | 10/1987 | Chung | C08K 5/098 428/379 |
| 4,708,623 | A | 11/1987 | Aoki et al. | |
| 4,710,533 | A | 12/1987 | Neuman | |
| 4,711,921 | A | 12/1987 | Lehr | |
| 4,801,627 | A | 1/1989 | Rahrig et al. | |
| 4,820,750 | A | 4/1989 | Lehr et al. | |
| 4,820,763 | A | 4/1989 | Yang | |
| 4,868,247 | A | 9/1989 | Lehr et al. | |
| 4,870,126 | A | 9/1989 | Kinson et al. | |
| 4,874,858 | A | 10/1989 | Magistro | |
| 4,888,148 | A | 12/1989 | Hartitz | |
| 4,965,309 | A * | 10/1990 | Batdorf | C08K 3/00 524/405 |
| 4,977,193 | A | 12/1990 | Croce et al. | |
| 5,008,145 | A | 4/1991 | Kinson et al. | |
| 5,026,582 | A | 6/1991 | Hartitz | |
| 5,059,261 | A | 10/1991 | Condo et al. | |
| 5,059,476 | A | 10/1991 | Steiniger et al. | |
| 5,064,293 | A | 11/1991 | Nakamura | |
| 5,080,968 | A | 1/1992 | Riew et al. | |
| 5,100,946 | A | 3/1992 | Hung et al. | |
| 5,102,465 | A | 4/1992 | Lamond | |
| 5,141,042 | A | 8/1992 | Schwaegerle | |
| 5,141,426 | A | 8/1992 | Capelle | |
| 5,194,498 | A | 3/1993 | Stevenson et al. | |
| 5,221,504 | A | 6/1993 | Capelle | |
| 5,268,424 | A | 12/1993 | Lawson | |
| 5,274,043 | A | 12/1993 | Greenlee et al. | |
| 5,281,379 | A | 1/1994 | Noguchi et al. | |
| 5,358,024 | A | 10/1994 | Schwaegerle | |
| 5,380,786 | A | 1/1995 | Greenlee et al. | |
| 5,494,718 | A | 2/1996 | Adams et al. | |
| 5,497,594 | A | 3/1996 | Giuseppe et al. | |
| 5,591,497 | A | 1/1997 | Hartitz | |
| 5,603,998 | A | 2/1997 | Hartitz | |
| 5,604,278 | A | 2/1997 | Hartitz | |

(56) References Cited

U.S. PATENT DOCUMENTS

| | | | |
|---|---|---|---|
| 5,735,599 | A | 4/1998 | Ishibashi et al. |
| 5,769,128 | A | 6/1998 | Auvil et al. |
| 5,775,378 | A | 7/1998 | Auvil et al. |
| 5,858,522 | A | 1/1999 | Turk et al. |
| 5,880,177 | A | 3/1999 | Higgs et al. |
| 5,882,564 | A | 3/1999 | Puppin |
| 5,948,492 | A | 9/1999 | Cargile |
| 5,969,045 | A | 10/1999 | Schmitz et al. |
| 6,015,611 | A | 1/2000 | Deaner et al. |
| 6,043,312 | A * | 3/2000 | Fagher ............... C08L 27/06 174/110 V |
| 6,054,538 | A * | 4/2000 | Thulliez ............ C08L 27/16 525/199 |
| 6,062,719 | A | 5/2000 | Busby et al. |
| 6,093,359 | A | 7/2000 | Gauchel et al. |
| 6,114,425 | A * | 9/2000 | Day ................... C08K 5/12 524/288 |
| 6,132,076 | A | 10/2000 | Jana et al. |
| 6,136,246 | A | 10/2000 | Rauwendaal et al. |
| 6,190,581 | B1 | 2/2001 | Duffin, Jr. et al. |
| 6,210,616 | B1 | 4/2001 | Suwanda |
| 6,216,608 | B1 | 4/2001 | Woods et al. |
| 6,328,919 | B1 | 12/2001 | Pham et al. |
| 6,352,039 | B1 | 3/2002 | Woods et al. |
| 6,365,710 | B1 | 4/2002 | Wang et al. |
| 6,428,728 | B1 | 8/2002 | Sakai et al. |
| 6,464,913 | B1 | 10/2002 | Korney, Jr. |
| 6,513,963 | B2 | 2/2003 | Derezinski |
| 6,531,526 | B1 | 3/2003 | Detterman |
| 6,565,784 | B1 | 5/2003 | Esseghir et al. |
| 6,590,041 | B1 | 7/2003 | Eguchi et al. |
| 6,593,403 | B1 | 7/2003 | Simon et al. |
| 6,682,814 | B2 | 1/2004 | Hendrickson et al. |
| 6,821,599 | B1 | 11/2004 | Kuroda et al. |
| 7,030,179 | B2 | 4/2006 | Patterson et al. |
| 7,144,952 | B1 | 12/2006 | Court et al. |
| 7,198,840 | B2 | 4/2007 | Lee et al. |
| 7,238,739 | B2 | 7/2007 | Hawrylko et al. |
| 7,858,008 | B2 | 12/2010 | Lee et al. |
| 7,943,691 | B2 | 5/2011 | Shakir et al. |
| 2001/0044487 | A1* | 11/2001 | Day ................... C08K 5/0066 524/296 |
| 2002/0188077 | A1 | 12/2002 | Kumaki et al. |
| 2003/0157321 | A1 | 8/2003 | Dalal et al. |
| 2003/0195279 | A1* | 10/2003 | Shah ................... C08K 5/5477 524/100 |
| 2005/0182167 | A1* | 8/2005 | Goodson ............. B32B 27/20 524/115 |
| 2005/0234155 | A1* | 10/2005 | Bacaloglu ........... C08L 27/06 524/17 |
| 2006/0111495 | A1 | 5/2006 | Tabla et al. |
| 2006/0194904 | A1* | 8/2006 | Moy .................... C08L 27/06 524/127 |
| 2009/0075539 | A1 | 3/2009 | Dimanshteyn et al. |
| 2010/0012906 | A1* | 1/2010 | Layman, Jr. ....... C07F 9/12 252/601 |
| 2010/0311855 | A1* | 12/2010 | Quante ............... C09K 21/14 521/150 |
| 2011/0198108 | A1* | 8/2011 | Abu-Ali .............. C08K 5/12 174/118 |
| 2012/0142839 | A1 | 6/2012 | Day |
| 2014/0116749 | A1* | 5/2014 | Shoemaker ......... C08K 5/12 174/110 SR |
| 2015/0353711 | A1* | 12/2015 | Zucchelli ............ C08K 5/0066 524/147 |
| 2016/0075866 | A1* | 3/2016 | Kahn ................... B32B 27/40 428/339 |
| 2016/0122471 | A1* | 5/2016 | Bae ..................... C08J 3/18 524/310 |
| 2016/0237297 | A1 | 8/2016 | Kuwahara et al. |
| 2017/0121456 | A1* | 5/2017 | Bae ..................... C08L 67/08 |
| 2017/0121514 | A1* | 5/2017 | Chaudhary ......... C08L 23/0892 |
| 2017/0335197 | A1* | 11/2017 | Abu-Ali .............. C08K 5/098 |

FOREIGN PATENT DOCUMENTS

| | | |
|---|---|---|
| CN | 107141659 A | 9/2017 |
| EP | 0 107 063 A1 | 5/1984 |
| GB | 1 564 087 A | 4/1980 |
| JP | H03-195754 A | 8/1991 |
| JP | H08-188652 A | 7/1996 |
| JP | 2004-107520 A | 4/2004 |
| WO | WO 00/36009 A1 | 6/2000 |
| WO | WO-0036009 A1 * 6/2000 ............. C08L 27/06 |
| WO | WO 2008/154153 A2 | 12/2008 |
| WO | WO 2014/070355 A1 | 5/2014 |
| WO | WO 2017/201130 A1 | 11/2017 |
| WO | WO 2019/055426 A1 | 3/2019 |
| WO | WO 2020/086455 A1 | 4/2020 |

OTHER PUBLICATIONS

International Preliminary Report on Patentability for International Application No. PCT/US2018/050498 dated Mar. 26, 2020.

Office Communication for U.S. Appl. No. 16/283,322 dated Jun. 1, 2020.

[No Author Listed], Chlorinated Polyethylene (CPE) Website. Zijiang Chemical. In existence prior to Oct. 21, 2019 at <http://www.zijiangchem.com/products_detail_en/id/19.html>. 4 pages.

[No Author Listed], CPE/CM Chlorinated Polyethylene: The Technical Specification. In existence prior to Oct. 21, 2019 at <http://dhard.ucp-is.com/docs/specs/rubber/CSPE/CPE.gen.spec.pdf>. 1 page.

[No Author Listed], Extruding Cubes of Rigid Geon® Vinyls into Profiles. Technical Service Report No. 13. PolyOne Corporation. 1992:4 pages.

[No Author Listed], Extrusion of Geon® Rigid Cellular Vinyl. Technical Service Report No. 7. PolyOne Corporation. Apr. 1993:6 pages.

[No Author Listed], Fiberloc® 97510 Vinyl Compound Technical Data Sheet. PolyOne Corporation. May 16, 2001:1 page.

[No Author Listed], Fiberloc® 97520 Vinyl Compound Technical Data Sheet. PolyOne Corporation. May 16, 2001:1 page.

[No Author Listed], Fiberloc® 97530 Vinyl Compound Technical Data Sheet. PolyOne Corporation. May 16, 2001:1 page.

[No Author Listed], Sheet Extrusion of Geon® Rigid PVC Compounds. Technical Service Report No. 1. PolyOne Corporation. Mar. 1995:4 pages.

[No Author Listed], Weipren CPE 6335 Technical Data Sheet. Lianda. Jan. 2012:1 page.

Gibbons et al., Extrusion. Mod Plast Encycl. 1986: 220-34.

Jia et al., Properties of poly(vinyl chloride) incorporated with a novel soybean oil based secondary plasticizer containing a flame retardant group. J Appl Poly Sci. Mar. 2015;132(25): 9 pages.

Meijer et al., The Modeling of Continuous Mixers. Part I: The Corotating Twin-Screw Extruder. Polymer Engineering and Science. Mar. 1988;28(5):282-4.

Rauwendaal, Polymer Extrusion. 1986: 458-76.

Summers et al., The Chemical Mechanisms of Outdoor Weathering in Polyvinyl Chloride. J Vin Tech 1983;5(3):91-5.

Weil et al., Flame and Smoke Retardants in Vinyl Chloride Polymers—Commercial Usage and Current Developments. J Fire Sci. May 2006; 24: 211-36. Epub Apr. 27, 2006.

Office Action for CN Application No. 201880067605.9 dated Aug. 11, 2021.

Feng et al., Synthesis of a novel phosphorus-containing plasticizer based on castor oil and its application for flame retardancy of polyvinyl chloride. Korean J Chem Eng. Jun. 30, 2015;32(6):1201-6. Abstract only.

Jia, Synthesis and Performance of Castor Oil-Based Flame Retardant Plastic Plasticizers. China Doctoral Dissertations Full-text Database Science-Engineering. Jan. 15, 2017;1:B016-6. Abstract only.

* cited by examiner

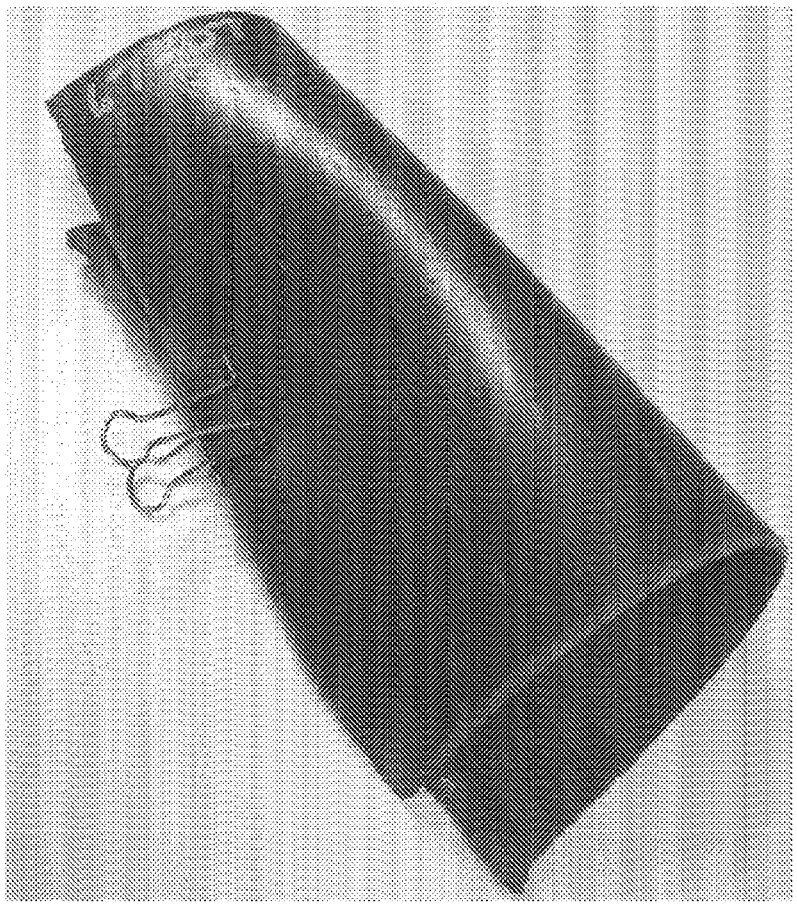

FLAME RETARDANT POLY(VINYL CHLORIDE) COMPOUNDS

CLAIM OF PRIORITY

This application is a national stage filing under 35 U.S.C. § 371 of International Patent Application No. PCT/US2018/050498, filed Sep. 11, 2018, which claims the benefit of U.S. Provisional Patent Application Ser. No. 62/559,252 filed on Sep. 15, 2017, each of which is hereby incorporated by reference in its entirety.

FIELD OF THE INVENTION

This invention concerns use of plasticized poly(vinyl chloride) compounds for such purposes as a flexible, flame retardant, polymeric, building and construction product.

BACKGROUND OF THE INVENTION

People benefit from plastic articles. From their invention in the mid-20th Century until the present, thermoplastic polymers have become the composition of many consumer products. Such products are relatively lightweight, sturdy, and corrosion resistant.

Plasticized poly(vinyl chloride), invented by Waldo Semon of B.F. Goodrich, has been a top performing plastic resin for decades. Billions of kilograms of poly(vinyl chloride) (also known as "PVC") resin are molded and extruded each year into countless products. With conventional additives, poly(vinyl chloride) provides unparalleled durability, flame resistance, chemical resistance, weatherability, electrical properties, and clarity to name a few.

Wire and cable manufacturers often use plasticized PVC for insulation and sheathing in building and construction environments. Performance of plasticized PVC compound at various temperatures is predicted based on accelerated oven aging tests. A cable rated at 60° C. by Underwriters' Laboratories (UL) is tested at 100° C. for seven days, whereas a cable rated at 75° C. is tested at 100° C. for ten days. Some plasticizers conventionally used are phthalates, citrates, soyates, and trimellitates.

For other types of materials used in building and construction environments, ASTM International (www.astm.org) has established a strict standard for testing the surface burning characteristics of building materials: "ASTM E84-15a Standard Test Method for Surface Burning Characteristics of Building Materials." This E84 test concerns the fire-test-response standard for the comparative surface burning behavior of building materials applicable to exposed surfaces such as walls and ceilings. The E84 test is conducted with the specimen in the ceiling position with the surface to be evaluated exposed face down to the ignition source. To satisfy the requirements of the E84 test, the material, product, or assembly shall be capable of being mounted in the test position during the test. Thus, the specimen shall either be self-supporting by its own structural quality, held in place by added supports along the test surface, or secured from the back side.

SUMMARY OF THE INVENTION

What is needed in the art is a plasticized PVC compound that is flexible and can pass the E84 test identified above. The more rigid the poly(vinyl chloride) compound, the easier it is to pass the E84 test. But if one reformulates for flexibility as is desired in this instance, then the E84 test is more difficult to pass.

Therefore, plasticized PVC compounds need a careful balance of ingredients, to be flame retardant and flexible.

One aspect of the present invention is a flame retardant poly(vinyl chloride) compound, comprising: a mixture of (a) poly(vinyl chloride); (b) a plasticizer selected from the group consisting of (1) polymeric plasticizer, (2) alkyl aryl fire retardant plasticizer, and combinations thereof and optionally (c) functional additives, wherein the mixture has a Limiting Oxygen Index of greater than 50% according to ASTM D2863; an Elongation at Break of at least 10% according to ASTM D638 (Type IV); and a Modulus of Elasticity of less than about 15,000 psi according to ASTM 638 (Type IV).

Another aspect of the present invention is a building and construction article made from the poly(vinyl chloride) compound identified above.

BRIEF DESCRIPTION OF DRAWING

FIG. 1 is a photograph of a test plaque of Example 4.

EMBODIMENTS OF THE INVENTION

Poly(Vinyl Chloride) Resins

Polyvinyl chloride polymers are widely available throughout the world. Polyvinyl chloride resin as referred to in this specification includes polyvinyl chloride homopolymers, vinyl chloride copolymers, graft copolymers, and vinyl chloride polymers polymerized in the presence of any other polymer such as a HDT distortion temperature enhancing polymer, impact toughener, barrier polymer, chain transfer agent, stabilizer, plasticizer or flow modifier.

For example a combination of modifications may be made with the PVC polymer by overpolymerizing a low viscosity, high glass transition temperature (Tg) enhancing agent such as SAN resin, or an imidized polymethacrylate in the presence of a chain transfer agent.

In another alternative, vinyl chloride may be polymerized in the presence of said Tg enhancing agent, the agent having been formed prior to or during the vinyl chloride polymerization. However, only those resins possessing the specified average particle size and degree of friability exhibit the advantages applicable to the practice of the present invention.

In the practice of the invention, there may be used polyvinyl chloride homopolymers or copolymers of polyvinyl chloride comprising one or more comonomers copolymerizable therewith. Suitable comonomers for vinyl chloride include acrylic and methacrylic acids; esters of acrylic and methacrylic acid, wherein the ester portion has from 1 to 12 carbon atoms, for example methyl, ethyl, butyl and ethylhexyl acrylates and the like; methyl, ethyl and butyl methacrylates and the like; hydroxyalkyl esters of acrylic and methacrylic acid, for example hydroxymethyl acrylate, hydroxyethyl acrylate, hydroxyethyl methacrylate and the like; glycidyl esters of acrylic and methacrylic acid, for example glycidyl acrylate, glycidyl methacrylate and the like; alpha, beta unsaturated dicarboxylic acids and their anhydrides, for example maleic acid, fumaric acid, itaconic acid and acid anhydrides of these, and the like; acrylamide and methacrylamide; acrylonitrile and methacrylonitrile; maleimides, for example, N-cyclohexyl maleimide; olefin, for example ethylene, propylene, isobutylene, hexene, and the like; vinylidene chloride, for example, vinylidene chloride; vinyl ester, for example vinyl acetate; vinyl ether, for example methyl vinyl ether, allyl glycidyl ether, n-butyl vinyl ether and the like; crosslinking monomers, for example diallyl phthalate, ethylene glycol dimethacrylate, methylene bis-acrylamide, tracrylyl triazine, divinyl ether, allyl silanes and the like; and including mixtures of any of the above comonomers.

The present invention can also use chlorinated polyvinyl chloride (CPVC), wherein PVC containing approximately 57% chlorine is further reacted with chlorine radicals produced from chlorine gas dispersed in water and irradiated to generate chlorine radicals dissolved in water to produce CPVC, a polymer with a higher glass transition temperature (Tg) and heat distortion temperature. Commercial CPVC typically contains by weight from about 58% to about 70% and preferably from about 63% to about 68% chlorine. CPVC copolymers can be obtained by chlorinating such PVC copolymers using conventional methods such as that described in U.S. Pat. No. 2,996,489, which is incorporated herein by reference. Commercial sources of CPVC include Lubrizol Corporation.

The preferred composition is a polyvinyl chloride homopolymer.

Commercially available sources of polyvinyl chloride polymers include OxyVinyls LP of Dallas, Tex. and Shintech USA of Freeport, Tex.

PVC Compounds

Flexible PVC resin compounds typically contain a variety of additives selected according to the performance requirements of the article produced therefrom well within the understanding of one skilled in the art without the necessity of undue experimentation.

Plasticizers

Non-limiting examples of plasticizers conventionally used with poly(vinyl chloride) are phthalates, citrates, soyates, and trimellitates. In this instance two specific plasticizers are currently preferred.

One currently preferred plasticizer is Palamoll™ 654 medium viscosity polymeric plasticizer, which is a mixture of hexanedioic acid, polymer with 1,4-butanediol and 2,2-dimethyl-1,3-propanediol, isononyl ester sold by BASF. The plasticizer is non-phthalate, a consideration in current market conditions and is registered as CAS No. 208945-12-4.

The other currently preferred plasticizer is Santicizer™ 2148 plasticizer, which is r sold by Valtris and is registered as CAS No. 27460-02-2.

Either the polymeric plasticizer or the alkyl aryl plasticizer can be used as the only plasticizer for the flame retardant PVC compound. Alternatively, the two plasticizers can be combined in any ratio between above.

Whether alone or combined, the parts by weight of the currently preferred plasticizer(s) range(s) from about 115 to 130 parts per 100 parts of the PVC polymer.

Other Functional Additives

The PVC compounds used herein can contain effective amounts of additives according to the experimental results identified in the Examples.

The poly(vinyl chloride) compound disclosed here as suitable for building and construction environments requiring passage of the E84 test include:

Calcium-zinc heat stabilizers, if present, in the amount of from about 1 to about 4 parts per 100 parts of PVC;

Alumina trihydrate flame retardant, if present, in the amount of from about 320 to about 380 parts per 100 parts of PVC;

Zinc borate flame retardant, if present, in the amount of from about 20 to 30 parts per 100 parts of PVC;

Smoke suppressant, if present, comprising a Basic Zinc Molybdate Complex on $Mg(OH)_2$ in the amount of from 3 to 8 parts per 100 parts of PVC;

Calcium carbonate functional filler, if present, in the amount of from about 150 to about 300 parts per 100 parts of PVC;

Stearic acid lubricant, if present, in the amount of from about 0.25 to about 0.75 parts per 100 parts of PVC; and Carbon black pigment, if present, in the amount of from about 2 to about 5 parts per 100 parts of PVC.

The compound disclosed here can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as Plastics Additives Database (2004) from Plastics Design Library (www.elsevier.com), can select from many different types of additives for inclusion into the compounds of the present invention.

Non-limiting examples of other optional additives include adhesion promoters; biocides (antibacterials, fungicides, and mildewcides); anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Processing

The preparation of compounds of the present invention is as follows. The compound of the present can be made in batch or continuous operations from a powder blend which is typically prepared in a batch-wise operation.

Such powder blending in a batch process typically occurs in a powder mixer such as a Henschel or Littleford mixer, or a ribbon blender that physically mixes all the additives including liquid plasticizers with PVC resin without bringing the polymer matrix to a melting temperature. The mixing speeds range from 60 to 3000 rpm and temperature of mixing can be ambient up to 250° F. (121° C.). The output from the mixer is a well blended powder product that can flow into a machine that can bring up the blend temperature to induce melting of some ingredients including the PVC resin.

Mixing in a batch process typically occurs in a Banbury mixer that is also elevated to a temperature that is sufficient to melt the polymer matrix to permit addition of the solid ingredient additives of any optional additive. The mixing speeds range from 60 to 3000 rpm and temperature of mixing ranges from 250° F. to 430° F. (120° C. to 220° C.), typically 325° F. (163° C.). Then, the melted mixture is put on to a two roll mill at 320° F./345° F. (160-174° C.). The material is milled for about four minutes and then the milled, compounded strip is then cubed for later extrusion or molding into polymeric articles. Alternatively, for experimental evaluation, the compounded strip can be formed into a plaque by compression molding for physical testing purposes.

Compounds can be formed into powder, cubes, or pellets for further extrusion into profile or sheet form, with or without subsequent molding, into polymeric components and parts.

Extrusion and molding techniques are well known to those skilled in the art of thermoplastics polymer engineering. Without undue experimentation but with such references as "Extrusion, The Definitive Processing Guide and Handbook" "Specialized Molding Techniques" and "Handbook of Mold, Tool and Die Repair Welding" published by Plastics Design Library (www.elesevier.com), one can make articles of any conceivable shape and appearance using compounds of the present invention. Non-limiting examples are reshaping in the melt form into extruded, molded, thermoformed, calendered, or 3D printed polymer articles.

For the E84 test, calendered, thermoformed, or other high aspect ratio polymer articles can be made.

USEFULNESS OF THE INVENTION

Building and construction markets can benefit from the PVC compounds disclosed herein. With a combination of flame retardance sufficient to pass the E84 test and also have sufficient flexibility to be useful as a building or construction material, occupied spaces can utilize these compounds in a variety of shapes. For example, profile extruded parts can complement high aspect ratio parts, both from the same or similar compounds disclosed herein. Also, post-shaping of films, sheets, panels, etc. can be used in both ceiling and wall construction.

As stated previously, rigid poly(vinyl chloride) can pass the E84 test. But rigidity is not preferred in building and construction. Increasing the flexibility of the poly(vinyl chloride) increases the usefulness of the PVC compound in building and construction but decreases its chances of passing the E84 test. As the Example and Comparative Examples demonstrate, finding that rare balance of ingredients can yield a successful candidate for flexible, flame retardant building and construction products.

Examples

Table 2 shows the sources of ingredients for the Examples and all Comparative Examples. Table 3 shows the processing conditions for making all experimental samples.

TABLE 2

| Ingredient | Chemical Name | Purpose | Company |
|---|---|---|---|
| PVC RESIN OXY 240 | PVC Homopolymer Resin | PVC Resin | OxyVinyls |
| PLASTISTAB 2581 | CaZn Heat Stabilizer | Stabilizer | AM Stabilizers |
| PALAMOLL 654 CAS No. 208945-12-4 | Polymeric Plasticizer | Plasticizer | BASF |
| SANTICIZER 2148 CAS No. 27460-02-2 | Aryl Phosphate | Flame Retardant Plasticizer | Valtris |
| ALUMINA TRIHYDRATE | Alumina Trihydrate | Flame Retardant | Various |
| CHARMAX FS-BZMA | Basic Zinc Molybdate Complex on Mg(OH)$_2$ | Smoke Suppressant | Polymer Additives Group |
| CALCIUM CARBONATE GLC-1012D | Calcium Carbonate | Filler | GLG Minerals |
| STEARIC ACID | Stearic Acid | Lubricant | Various |
| N550 CARBON BLACK | Carbon Black | Pigment | Columbian |

TABLE 3

Processing Instructions
1 Roll Mill

Weigh All Ingredients Together in One Container
Mix Well and then Mill at 320-335° F. (160-168° C.) for 4 Minutes
Compression Press at 345° F. (174° C.) to
form plaques for physical testing

TABLE 4

| Test Name | Testing Authority | Test No. | Variations | Units |
|---|---|---|---|---|
| Specific Gravity* | ASTM | D792 | — | — |
| Durometer Hardness, A, Instant** | ASTM | D2240 | Shore A | — |
| Durometer Hardness, A, 15 sec delay** | ASTM | D2240 | Shore A | — |
| Durometer Hardness, D, Instant** | ASTM | D2240 | Shore D | — |
| Durometer Hardness, D, 15 sec delay** | ASTM | D2240 | Shore D | — |
| Flexible Tensile*** | ASTM | D638 | type IV | psi |
| 100% Modulus*** | ASTM | D638 | type IV | psi |
| Elongation*** | ASTM | D638 | type IV | % |
| Flame: LOI Oxygen Index**** | ASTM | D2863 | | % Oxygen |

*0.63 cm thick sample
**5.08 cm × 508 cm × 0.63 cm sample
***15.2 cm × 15.2 cm × 1.9 cm sample
****15.2 cm × 15.2 cm × 0.32 cm sample Table 5 shows the formulations and physical properties of the Examples and the Comparative Examples.

TABLE 5

Formulations and Test Results

| Example (Parts by Weight) | A | B | 1 | 2 | 3 | C | 4 | D | 5 | 6 |
|---|---|---|---|---|---|---|---|---|---|---|
| PVC RESIN OXY 240 | 100.00 | 100.00 | 100.00 | 100.00 | 100.00 | 100.00 | 100.00 | 100.00 | 100.00 | 100.00 |
| PLASTISTAB 2581 | 1.76 | 1.76 | 1.76 | 1.76 | 1.76 | 1.76 | 1.76 | 1.76 | 1.76 | 1.76 |
| PALAMOLL 654 | 115.00 | 115.00 | 127.00 | 127.00 | 85.00 | 85.00 | 64.00 | 64.00 | 115.00 | 0.00 |
| SANTICIZER 2148 | 0.00 | 0.00 | 0.00 | 0.00 | 42.00 | 42.00 | 63.00 | 63.00 | 0.00 | 115.00 |
| ALUMINA TRIHYDRATE | 360.00 | 270.00 | 360.00 | 300.00 | 360.00 | 300.00 | 360.00 | 300.00 | 360.00 | 360.00 |
| FR ZINC BORATE (FB467) | 25.00 | 25.00 | 25.00 | 25.00 | 25.00 | 25.00 | 25.00 | 25.00 | 25.00 | 25.00 |
| CHARMAX FS-BZMA | 5.00 | 5.00 | 5.00 | 5.00 | 5.00 | 5.00 | 5.00 | 5.00 | 5.00 | 5.00 |
| CALCIUM CARBONATE GLC-1012D | 175.00 | 270.00 | 175.00 | 250.00 | 175.00 | 250.00 | 175.00 | 250.00 | 175.00 | 175.00 |

TABLE 5-continued

Formulations and Test Results

| Example (Parts by Weight) | A | B | 1 | 2 | 3 | C | 4 | D | 5 | 6 |
|---|---|---|---|---|---|---|---|---|---|---|
| STEARIC ACID | 0.50 | 0.50 | 0.50 | 0.50 | 0.50 | 0.50 | 0.50 | 0.50 | 0.31 | 0.31 |
| N55O CARBON BLACK | 3.52 | 3.52 | 3.52 | 3.52 | 3.52 | 3.52 | 3.52 | 3.52 | 3.52 | 3.52 |
| Total Parts: | 785.78 | 790.78 | 797.78 | 812.78 | 797.78 | 812.78 | 797.78 | 812.78 | 785.59 | 785.59 |
| Specific Gravity | 1.93 | 1.98 | 1.90 | 1.93 | 1.89 | 1.91 | 1.89 | 1.91 | 1.93 | 1.92 |
| Durometer Hardness, A, Instantaneous | 98 | 98 | 97 | 96 | 93 | 92 | 92 | 92 | 98 | 95 |
| Durometer Hardness, A, 15 sec delay | 97 | 96 | 95 | 94 | 89 | 88 | 88 | 88 | — | — |
| Durometer Hardness, D, Instantaneous | 60 | 60 | 54 | 52 | 42 | 38 | 41 | 40 | — | — |
| Durometer Hardness, D, 15 sec delay | 49 | 49 | 44 | 42 | 33 | 29 | 32 | 30 | — | — |
| Tensile Strength at break (psi) | 728 | 738 | 754 | 530 | 433 | 334 | 368 | 280 | 916 | 553 |
| Modulus of Elasticity (psi) | 13,000 | 16,000 | 10,000 | 11,500 | 5,700 | 6,300 | 5,700 | 5,400 | 14,700 | 8,500 |
| Elongation (%) | 9 | 9 | 16 | 14 | 15 | 26 | 31 | 43 | 12.7 | 10 |
| Flame: LOI Oxygen Index | 82 | 77 | 70 | 66 | 60 | 49 | 57 | 47 | 78 | 54 |

Of the ten formulations, six were able to satisfy the conditions of flexibility and flame retardance.

All ten formulations had the same amounts of PVC polymer, heat stabilizer, zinc borate flame retardant, smoke suppressant, and carbon black. Thus, the plasticizer content, the alumina trihydrate flame retardant, stearic acid, and the calcium carbonate filler were varied.

For Comparative Examples A-B and Examples 1, 2, and 5, no Santicizer 2148 Aryl Phosphate Flame Retardant Plasticizer was used. One difference between Examples 1 and 2 and Comparative Examples A and B was the higher parts of Palamoll 654 polymeric plasticizer which caused a slight reduction in Limiting Oxygen Index but higher (and acceptable) percent Elongation. The difference between Comparative Example A and Example 5 was the amount of lubricant, which caused a significant difference in Elongation results even though Moduli of Elasticity were both within the acceptable range of less than 15,000 psi.

The total plasticizer content for Comparative Examples A and B and Examples 5 and 6 was 115 parts vs. Examples 1-4 and Comparative Examples all having 127 total parts of plasticizer present. Satisfaction of the three criteria of Moduli of Elasticity, Elongation, and Limiting Oxygen Index caused separation of Examples 1-6 from Comparative Examples A-D.

The use of either the Palamoll 654 plasticizer or the Santicizer 2148 plasticizer (also having flame retardant properties) or both also provided differentiation within Examples 1-6. Examples 1, 2, and 5 used only the former, while Example 6 used only the latter.

Comparative Examples C-D and Examples 3 and 4 tested the ratio of Paramoll™ 254 plasticizer to Santicizer 2148 plasticizer at 67:33 (2:1) and 50:50 (1:1) ratios. The comparison of Comparative Example C to Example 3 and the comparison of Comparative Example D to Example 4 were consistent at both ratios tested by Examples 3 and 4 providing slightly higher Moduli of Elasticity results but also significantly higher percent Elongation. The differentiation between the two pairs was the 20% larger amount of alumina trihydrate flame retardant present in Examples 3 and 4 vs Comparative Examples C and D, respectively.

As between Example 3 and Comparative Example D, both having a 1:1 ratio of the two types of plasticizer, the Limiting Oxygen Index (LOI) test, a predictor for passing the E84 test, provided the basis of differentiating between the two sets of physical properties. The LOI results for Example 3 were 20% better than the LOI results for Comparative Example D.

While it is true that all but two of the Comparative Examples A and B have a higher LOI than any of the Examples, it is the balance of physical properties which must be established for a successful building and construction polymer article envisioned in this disclosure.

Only the formulations of Examples 1-6 satisfy the following criteria (with current preferences for the criteria within Examples 1-6):

a Limiting Oxygen Index of greater 50% according to ASTM D2863 (and with a current preference for greater than 55%);

an Elongation at Break of at least 10% according to ASTM D638 (Type IV) (and with a current preference for at least 20%); and a Modulus of Elasticity of less than about 15,000 according to ASTM 638 (Type IV) (and with a current preference for less than about 10,000.)

Operating within all three of the criteria at their current preference, Example 4 is presently preferred. FIG. 1 shows a photo of the flexibility of Example 4 with opposing edges touching as a result of restraint by a metallic binder clip.

Other of the physical properties can be adjusted according to commercial or manufacturing preferences. For example, use of additional calcium carbonate filler or use of additional different fillers, such as copper or tungsten metal particles, or both, can increase specific gravity.

Without undue experimentation and with use of the experimental results, a person having ordinary skill in the art will be able to construct formulations suitable for achieving physical properties for flame retardant, flexible PVC compounds within the acceptable and preferred criteria, respectively.

The invention is not limited to the above embodiments. The claims follow.

What is claimed is:

1. A flame retardant poly(vinyl chloride) compound, comprising:
a mixture of:
poly(vinyl chloride); and
a plasticizer comprising:
polymeric plasticizer, and/or
alkyl aryl fire retardant plasticizer;
wherein the mixture has:
a Limiting Oxygen Index of greater than 50% according to ASTM D2863;
an Elongation at Break of at least 10% according to ASTM D638 (Type IV); and
a Modulus of Elasticity of less than about 15,000 psi according to ASTM 638 (Type IV).

2. The flame retardant poly(vinyl chloride) compound of claim 1, wherein the plasticizer comprises a polymeric plasticizer.

3. The flame retardant poly(vinyl chloride) compound of claim 1, wherein the plasticizer comprises a polymeric plasticizer of a mixture of hexanedioic acid, polymer with 1,4-butanediol and 2,2-dimethyl-1,3-propanediol, isononyl ester.

4. The flame retardant poly(vinyl chloride) compound of claim 1, wherein the plasticizer comprises a polymeric plasticizer registered as CAS No. 208945-12-4.

5. The flame retardant poly(vinyl chloride) compound of claim 1, wherein the plasticizer comprises an alkyl aryl fire retardant plasticizer.

6. The flame retardant poly(vinyl chloride) compound of claim 1, wherein the plasticizer comprises a non-halogen alkyl aryl fire retardant plasticizer.

7. The flame retardant poly(vinyl chloride) compound of claim 1, wherein the plasticizer comprises an aryl phosphate registered as CAS No. 27460-02-2.

8. The flame retardant poly(vinyl chloride) compound of claim 1, wherein the plasticizer comprises a polymeric plasticizer and an alkyl aryl fire retardant plasticizer.

9. The flame retardant poly(vinyl chloride) compound of claim 8, wherein the plasticizer comprises a polymeric plasticizer of a mixture of hexanedioic acid, polymer with 1,4-butanediol and 2,2-dimethyl-1,3-propanediol, isononyl ester.

10. The flame retardant poly(vinyl chloride) compound of claim 8, wherein the mixture has:
a Limiting Oxygen Index of greater than 50% and less than or equal to 82% according to ASTM D2863;
an Elongation at Break of at least 10% and less than or equal to 43% according to ASTM D638 (Type IV); and
a Modulus of Elasticity of at least 5,400 psi and less than about 15,000 psi according to ASTM 638 (Type IV).

11. The flame retardant poly(vinyl chloride) compound of claim 8, wherein the poly(vinyl chloride) comprises poly(vinyl chloride) homopolymer.

12. The flame retardant poly(vinyl chloride) compound of claim 1, wherein the plasticizer comprises both a plasticizer registered as CAS No. 208945-12-4 and a plasticizer registered as CAS No. 27460-02-2, wherein the two plasticizers are combined in a ratio of from 99:1 to 1:99 of CAS No. 208945-12-4 to CAS No. 27460-02-2.

13. The flame retardant poly(vinyl chloride) compound of claim 12, wherein the two plasticizers are combined in a ratio of from 75:25 to 25:75 of CAS No. 208945-12-4 to CAS No. 27460-02-2.

14. The flame retardant poly(vinyl chloride) compound of claim 12, wherein the two plasticizers are combined in a ratio of from 67:33 to 33:67 of CAS No. 208945-12-4 to CAS No. 27460-02-2.

15. The flame retardant poly(vinyl chloride) compound of claim 1, wherein the total amount of any plasticizer with CAS No. 208945-12-4 and any plasticizer with CAS No. 27460-02-2 present in the mixture is from about 115 to about 130 parts per 100 parts of the poly(vinyl chloride), by weight.

16. The flame retardant poly(vinyl chloride) compound of claim 1, wherein the plasticizer comprises both plasticizer with CAS No. 208945-12-4 and plasticizer with CAS No. 27460-02 2, and the total amount of plasticizer with CAS No. 208945-12-4 and plasticizer with CAS No. 27460-02-2 present in the mixture is from about 115 to about 130 parts per 100 parts of the poly(vinyl chloride), by weight.

17. The flame retardant poly(vinyl chloride) compound of claim 1, wherein the mixture has a Limiting Oxygen Index of greater than 55% according to ASTM D2863.

18. The flame retardant poly(vinyl chloride) compound of claim 1, wherein the mixture has a Limiting Oxygen Index of less than or equal to 82% according to ASTM D2863.

19. The flame retardant poly(vinyl chloride) compound of claim 18, wherein the mixture has a Modulus of Elasticity of at least 5,400 psi according to ASTM 638 (Type IV).

20. The flame retardant poly(vinyl chloride) compound of claim 18, wherein the mixture has an Elongation at Break of less than or equal to 43% according to ASTM D638 (Type IV).

21. The flame retardant poly(vinyl chloride) compound of claim 20, wherein the mixture has a Modulus of Elasticity of at least 5,400 psi according to ASTM 638 (Type IV).

22. The flame retardant poly(vinyl chloride) compound of claim 1, wherein the mixture has an Elongation at Break of at least 20% according to ASTM D638 (Type IV).

23. The flame retardant poly(vinyl chloride) compound of claim 1, wherein the mixture has an Elongation at Break of less than or equal to 43% according to ASTM D638 (Type IV).

24. The flame retardant poly(vinyl chloride) compound of claim 1, wherein the mixture has a Modulus of Elasticity of less than 10,000 psi according to ASTM 638 (Type IV).

25. The flame retardant poly(vinyl chloride) compound of claim 1, wherein the mixture has a Modulus of Elasticity of at least 5,400 psi according to ASTM 638 (Type IV).

26. The flame retardant poly(vinyl chloride) compound of claim 1, wherein the poly(vinyl chloride) comprises poly(vinyl chloride) homopolymer.

27. The flame retardant poly(vinyl chloride) compound of claim 1, wherein the mixture further comprises a functional additive selected from the group consisting of calcium-zinc heat stabilizers, alumina trihydrate flame retardant, zinc borate flame retardant, basic zinc molybdate complex on magnesium hydroxide smoke suppressant, calcium carbonate density modifying filler, metallic particles density modifying filler, stearic acid lubricant, carbon black pigment, and any combination of the additives so listed.

28. A polymer article comprising the flame retardant poly(vinyl chloride) compound of claim 1.

* * * * *